United States Patent [19]

Gaglione et al.

[11] Patent Number: 6,069,637
[45] Date of Patent: *May 30, 2000

[54] SYSTEM FOR CUSTOM IMPRINTING A VARIETY OF ARTICLES WITH IMAGES OBTAINED FROM A VARIETY OF DIFFERENT SOURCES

[75] Inventors: Patrick Joseph Gaglione; Michael Anthony Morba, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,756

[22] Filed: Jul. 29, 1996

[51] Int. Cl.⁷ .................................................. G06T 11/60
[52] U.S. Cl. .......................... 345/435; 345/428; 345/113; 345/114; 707/508
[58] Field of Search .................................... 345/113, 114, 345/428, 435; 707/508

[56] References Cited

U.S. PATENT DOCUMENTS

| | | | |
|---|---|---|---|
| 5,038,218 | 8/1991 | Matsumoto | 358/296 |
| 5,477,264 | 12/1995 | Sarbadhikari et al. | 358/231 |
| 5,611,033 | 3/1997 | Pitteloud et al. | 345/435 |
| 5,649,032 | 7/1997 | Burt et al. | 382/284 |

OTHER PUBLICATIONS

Office of the future: Xerox DocuTech scans, manipulates, & prints digital images at high res., Work–Group Computing Report, v1, n20, p3(1), Oct. 8, 1990.

*Primary Examiner*—Mark R. Powell
*Assistant Examiner*—Motilewa Good-Johnson
*Attorney, Agent, or Firm*—Frank Pincelli

[57] ABSTRACT

A system and method for combining a first captured generated digital image. A mask representation of at least a portion of the second prestored digital image is displayed on the device with the captured generated digital image so as to produce a preview image. The system also allows for automatically sizing of text in accordance with a predetermined relationship prior to merging the captured generated digital image and the second prestored image. The system also displays the second prestored digital image at a first DPI resolution with the at least one first captured generated digital image and/or text while the preview image is being displayed so as to produce image merging instructions; and combining the first captured generated digital image and/or text at a second higher DPI resolution in accordance with the image merging instructions so as to form a merged digitally composed image subsequent to viewing the preview image.

27 Claims, 7 Drawing Sheets

SYSTEM FOR CUSTOM IMPRINTING A VARIETY OF ARTICLES WITH IMAGES OBTAINED FROM A VARIETY OF DIFFERENT SOURCES

FIELD OF THE INVENTION

A system and method for producing customized images by merging at least two images obtained from different sources and printing the image on at least one output format.

BACKGROUND OF THE INVENTION

It is known from U.S. Pat. No. 5,459,819 to provide a system and method for combining a first generated digital image with one or more second prestored digital images. It is also known from this reference that the image may be previewed and modified in order to make corrections to the image. However, a drawback with the current system is that it often takes significant amounts of time in order to have the combined image displayed before the operator can make any appropriate adjustments. Thus, the operator is often waiting before any work can be done. Often the providing of a full image rendition can take 3 minutes or more. Also, the foregoing system has also been found to be very labor-intensive in that often when providing special text at a particular location, appropriate sizing and adjustment must be made. This often takes significant amounts of time for the operator. Additionally, entries are made which may seem appropriate at the time of entering, but result in a product that is not aesthetically pleasant to the customer. For example, the size of the text entered may be too small, which makes it difficult to read. Thus, there exists the need to provide a process whereby the time in making corrections, entries, and modifications be done in a quick and efficient manner.

Applicants have invented an improved system and method whereby rendering of preview images can be accomplished relatively quickly and entries can be made easily and efficiently, allowing the operator to spend substantially less time to provide a higher quality product.

SUMMARY OF THE INVENTION

In accordance with one aspect of the present invention there is provided a method of combining a first captured generated digital image and/or text and a second prestored digital image, the second prestored digital image having one or more predetermined locations where a captured digital image and/or text may be placed, comprising the steps of:

a) providing the one first captured generated digital image;
b) providing the second prestored digital image;
c) displaying a mask representative of at least a portion of the second prestored digital image on a visual display device with the captured generated digital image and/or text placed in the one or more predetermined locations so as to produce a preview image;
d) making any desired modification to the captured generated digital image and/or text based on the preview; and
e) combining the first captured generated digital image and/or text as modified with the selected second prestored image so as to form a merged digitally composed image.

In accordance with another aspect of the present invention there is provided a method of combining a first captured generated digital text and a second prestored digital image, the second prestored digital image having one or more predetermined locations where a captured generated digital image and/or text may be placed, comprising the steps of:

a) providing a first captured generated digital text;
b) providing a second prestored digital image; and
c) automatically sizing the text in accordance with a predetermined relationship prior to merging the at least one first captured generated digital text and the selected second prestored image.

In accordance with yet another aspect of the present invention there is provided a method of combining a captured generated digital image and/or text and a second prestored digital image, the second prestored digital image having one or more predetermined locations where the captured generated digital image and/or text may be placed, comprising the steps of:

a) providing a first captured generated digital image at a first DPI resolution;
b) providing a prestored digital image stored in memory at a second DPI resolution and at a third DPI resolution, the third DPI resolution being substantially less than the second DPI resolution;
c) displaying the first captured digital image and/or text and the second prestored digital image of the third DPI resolution on a visual display device for previewing;
d) modifying the first captured digital image and/or the second prestored digital image during the previewing so as to obtain image merging instructions for effectuating the modifications; and
e) combining the first captured generated image and second prestored digital image of the second DPI resolution in accordance with the image merging instructions so as to form a newly merged digital image at the second DPI resolution.

In accordance with still another aspect of the present invention there is provided a method of combining a first captured generated digital image and/or text and a second prestored digital image, comprising the steps of:

a) obtaining a first captured generated digital image at a first DPI resolution and at a second DPI resolution, the first DPI resolution being substantially less than the second DPI resolution;
b) selecting a second prestored digital image, the second prestored digital image having one or more predetermined locations where a captured digital image and/or text may be placed and being stored in memory at a third DPI resolution and at a fourth DPI resolution, the third DPI resolution being substantially less than the fourth DPI resolution; and
c) displaying the selected second prestored digital image at the third DPI resolution on a visual display device with the first captured generated digital image and/or text placed in the predetermined location at the first DPI resolution so as to produce a preview image;
d) forming a final merged image using the at least one first captured generated digital image of the second DPI and the selected one of the prestored digital image of the fourth DPI.

In accordance with another aspect of the present invention there is provided a system for combining a captured generated digital image and/or text and a second prestored digital image, comprising:

a) means for providing a first captured generated digital image and/or text and a second prestored digital image, both said first and second images being stored in memory at a first DPI resolution and a second DPI resolution, the first DPI resolution being substantially less than the second DPI resolution;

b) means for selecting one of the second prestored digital images, each of the second prestored digital images having one or more predetermined locations where the first captured generated digital image and/or text may be placed;

c) a visual display device for displaying the selected second prestored digital image of the first DPI resolution with the first captured generated digital image and/or text placed in the one or more predetermined locations so as to produce a preview image;

d) means for making any desired modification to the first captured generated digital image and/or text while the preview image is being displayed so as to produce image merging instructions; and e) means for combining the first captured generated digital image and/or text at the second DPI resolution with the second prestored image at the second DPI in accordance with the image merging instructions so as to form a merged digitally composed image subsequent to viewing the preview image.

In accordance with still another aspect of the present invention there is provided a system for combining a first captured generated digital image and/or text with a second prestored digital image, comprising:

a) means for selecting a second prestored digital image having one or more predetermined locations where the first captured generated digital image and/or text may be placed;

b) a visual display device for displaying a digitally formed image;

c) means for making a digitally formed preview image, the preview image comprising combining the captured generated digital image and/or text merged with the second prestored image at a first DPI resolution; and d) means for combining the first captured generated digital image and/or text with the second prestored image as to form a second merged digitally composed image of a second DPI resolution, the second DPI resolution being substantially greater than the first resolution.

DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
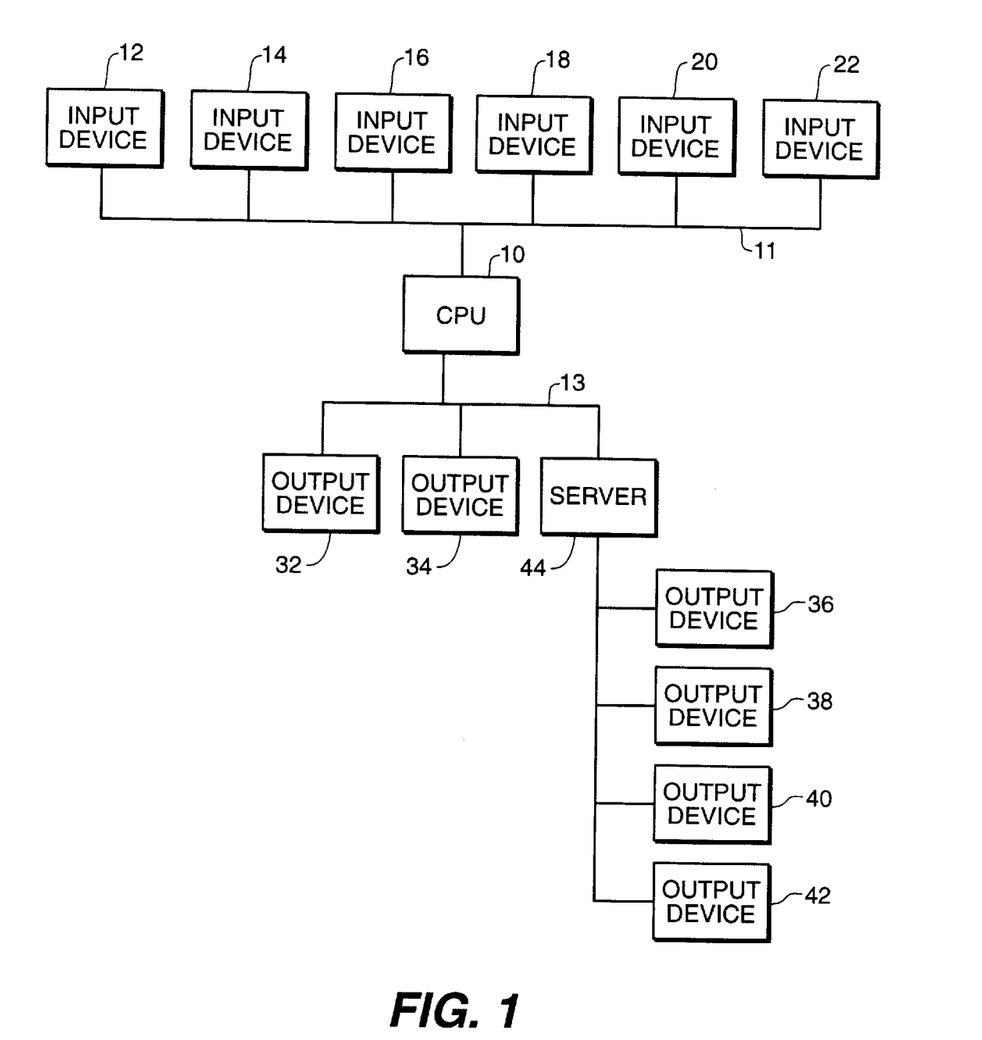
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera (where the output is digitized), and input device 18 comprises a CD (compact disc) reader for reading digitally stored information on a compact disc. Input device 20 comprises a electronic camera such as the DCS 200 Digital Camera, produced by the Eastman Kodak Company. Input device 22 may be any other input device which is capable of providing a digital signal representative of an image to the CPU, for example, video tape, video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, an Ethernet data link system could be used. The output device 32 for instance comprises an electrophotographic printer such as the Kodak Image Magic Heavy Stock Printer, sold by the Eastman Kodak Company, which takes the digital image and transfers the image onto media which can then be used to produce transfers for use on garments. The output device 34 in the embodiment illustrated is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as, garments, mugs, posters, banners, life size cut-outs, holographic and 3-D imaging, balloons, pens and pencils.

In the preferred embodiment illustrated, a server 44, such as the Power PC Apple Macintosh Computer, is provided for as managing information from the CPU 10 and for appropriately providing information to the various printing devices and other output devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

It is to be understood that the CPU 10 may be provided with a monitor for viewing various screens for indicating the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, which may be the operator and/or customer, can also view the various images being input into the system and generated by the system so that the appropriate selections can be made by the user and/or customer. In the CPU there is stored a plurality of prestored images which may comprise a variety of artistic themes having at least one location for receiving a customer generated digital image. Any one of these prestored images may be selected and digitally merged with the customer generated image(s) captured by any of the input devices 12,14,16,18,20,22.

A more detailed description of the operation of the system as disclosed in FIG. 1 is described in U.S. Pat. No. 5,459,819, which is hereby incorporated by reference in its entirety.

Figure 2:
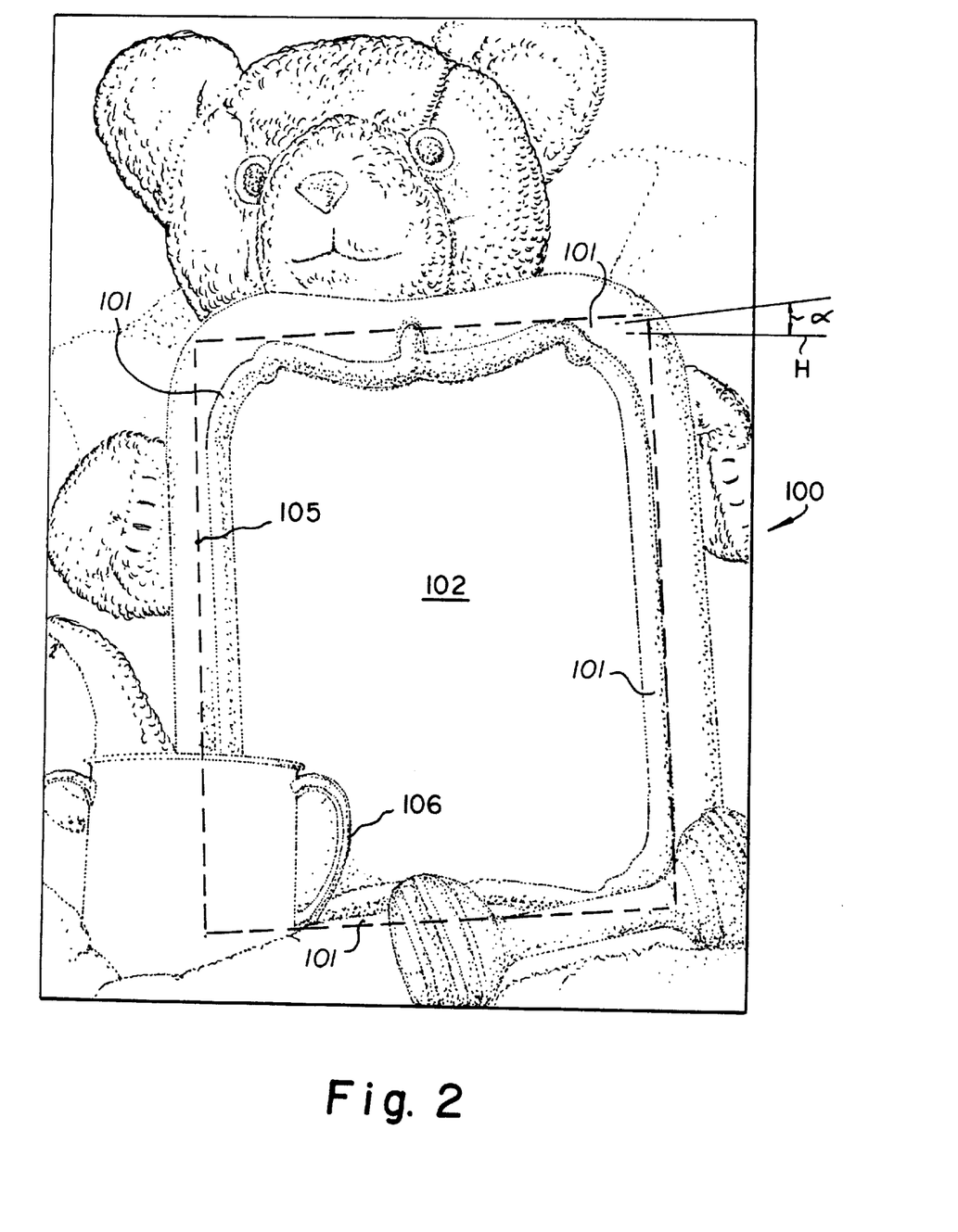
FIG. 2 illustrates an example of a prestored image having single location for receiving a customer generated digital image.
Figure 3:
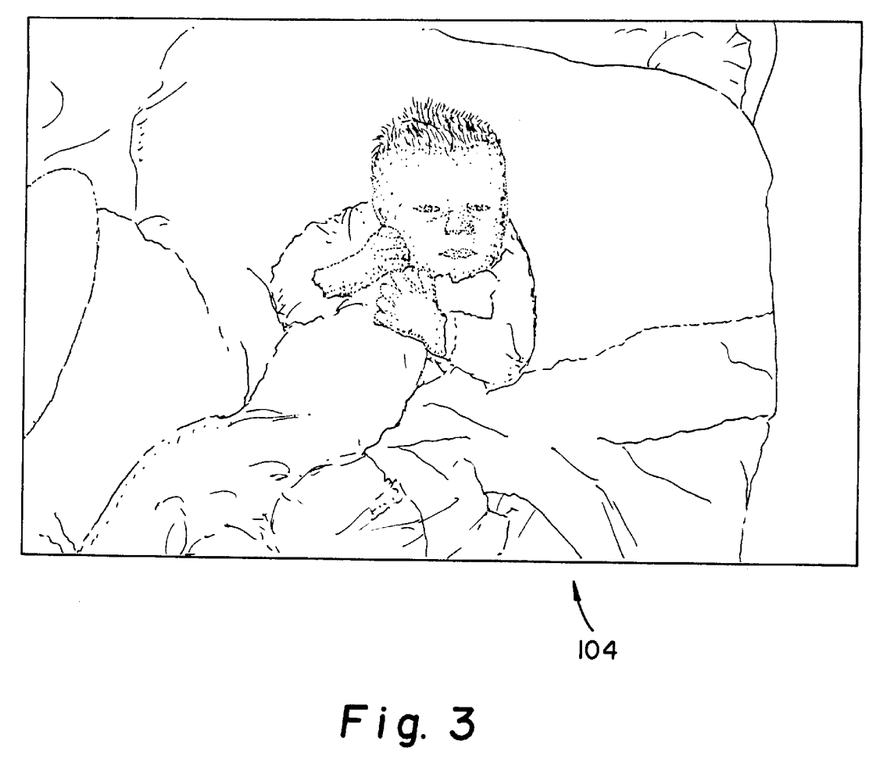
FIG. 3 is a customer generated digital image.
Figure 4:
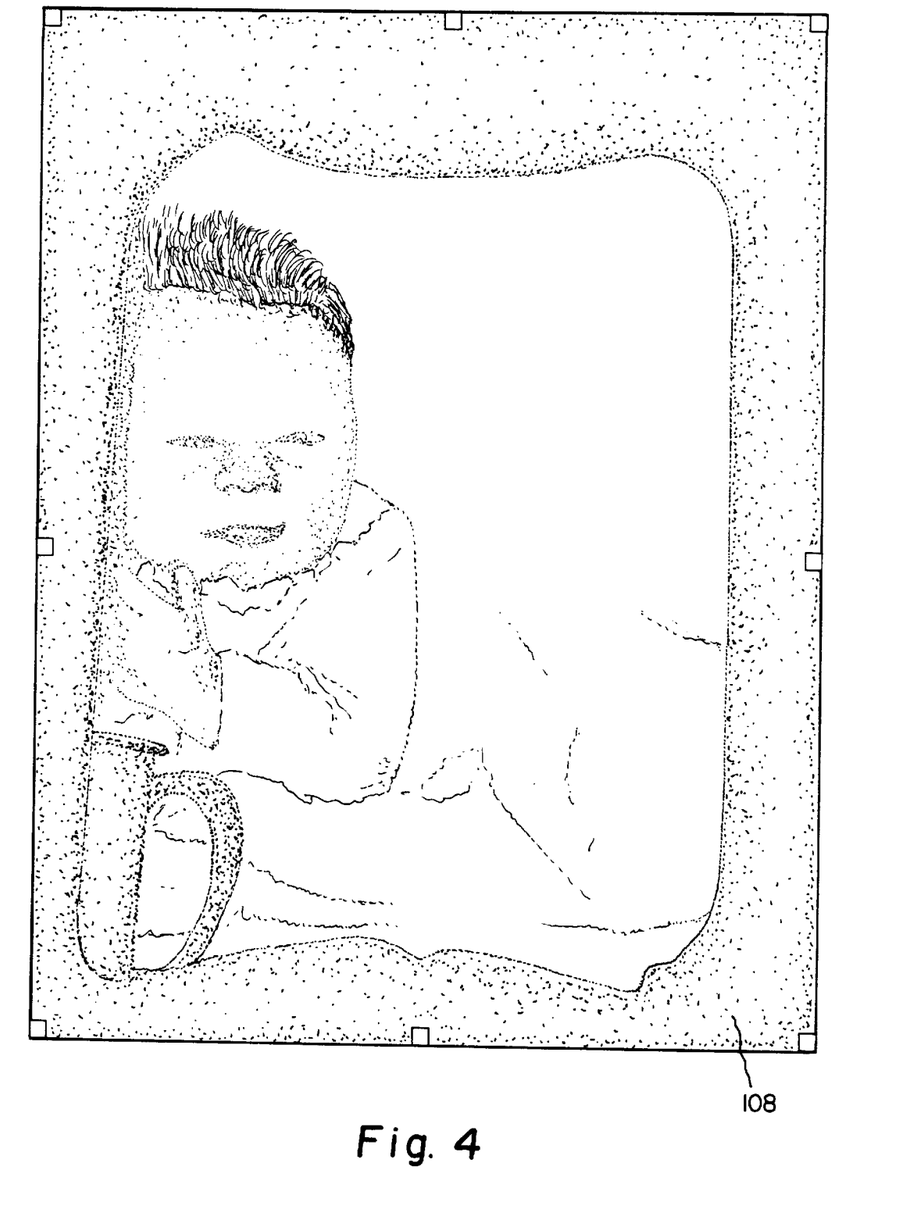
FIG. 4 is an illustration of a mask illustrative of the prestored digital image of FIG. 2 merged with the customer generated digital image of FIG. 3 as would be viewed on a CRT illustrating the customer generated image in an undesirable position.

Referring to FIG. 2, there is illustrated a prestored digital image 100 having a location/opening 102 designed to receive a customer generated image. Referring to FIG. 3, there is illustrated a customer generated image 104 which a customer has intended for merging with the prestored digital image 100 as illustrated in FIG. 2. As can be seen by FIG. 2, the prestored digital image 100 includes a protrusion 106 which covers a portion of the location 102 in which a customer generated image 104 (see FIG. 4) is to be placed. If the image 104 is not properly positioned in location 102, the overall visual effect can be adversely affected. That is, for example, if the image is not properly centered within the location, the overall visual effect of the combined prestored image and customer generated image 104, while technically correct, would have a very unpleasant visual affect to the consumer. Thus, it is important to properly position the image 104 in the location 102. Another problem is that intrusions present in the prestored image 100, such as protrusion 106, can also cover or interfere with certain portions of the image 104 that is to be merged therein. In the prior art system, it is possible to merge the two images together so as to produce a preview image which allows repositioning of the image 104 at location 102 by the operator so as to provide an aesthetically pleasing appearance. However, in the prior art the preview image provides a full rendition of the merged image on the display screen. Obtaining this full rendition can take substantial amounts of computing time. For example, if a full complete rendition of the two images is provided at full resolution, 2 to 3 minutes or more may be needed. However, Applicants have found that this time period can be significantly reduced. In the present invention each prestored digital image 100 is stored in memory at two different resolutions, a high resolution and a second substantially lower resolution. The low resolution prestored image is used by the operator in manipulating the merged image on the CRT which results in composing instructions that are later used for the merging of the high resolution prestored image with the high resolution customer generated image. Thus, the high resolution prestored image 100 is used by the CPU 10 to compose the final merged image that is forwarded to the output device to produce the customer selected product. Preferably, the low resolution image is equal to or less than about 60% of the high resolution image. In addition to utilizing a low resolution prestored image 100, only a portion of the prestored image need be used. In the preferred embodiment of the invention, the portion 101 is defined only by the portion of prestored image 100 surrounding each location 102 provided as illustrated by dash line 105 in FIG. 2, therefore, minimizing the amount of information needed. However, if desired, the entire prestored image 100 may be illustrated. Portion 101 can be stored as a part of the low resolution prestored image or as a separate image. Preferably, portion 101 illustrated on the CRT is a mask representation 108 of the portion 101 of prestored image 100. Referring to FIG. 4, a mask representation 108 of the portion of image 100 surrounding location 102 is illustrated with the customer generated image 104 of FIG. 3 inserted therein. In the preferred embodiment illustrated, the mask representation 108 of the prestored image is simply a silhouette representation of the original prestored image. This silhouette provides a mask which can be quickly and easily retrieved by the computer as it is typically monotone in color and of relatively low resolution. In the particular embodiment illustrated, the mask silhouette 108 has a resolution of 70 DPI. Likewise, the customer generated image can be stored at two DPI resolutions, a low resolution for previewing the image, and a high resolution for making the final product. The low resolution of customer generated image 104 is placed at location 102, preferably also 70 DPI. As can be seen from the combined image illustrated in FIG. 4, the protrusion 106 covers a portion of the infant in the image and is also not centered at location 102. This would typically be considered an undesirable visual representation of the merged images. Thus, at this point, instructions regarding the merging of the two images can be quickly and easily obtained so that the final merged digital image will not have the undesirable visual features.

Figure 5:
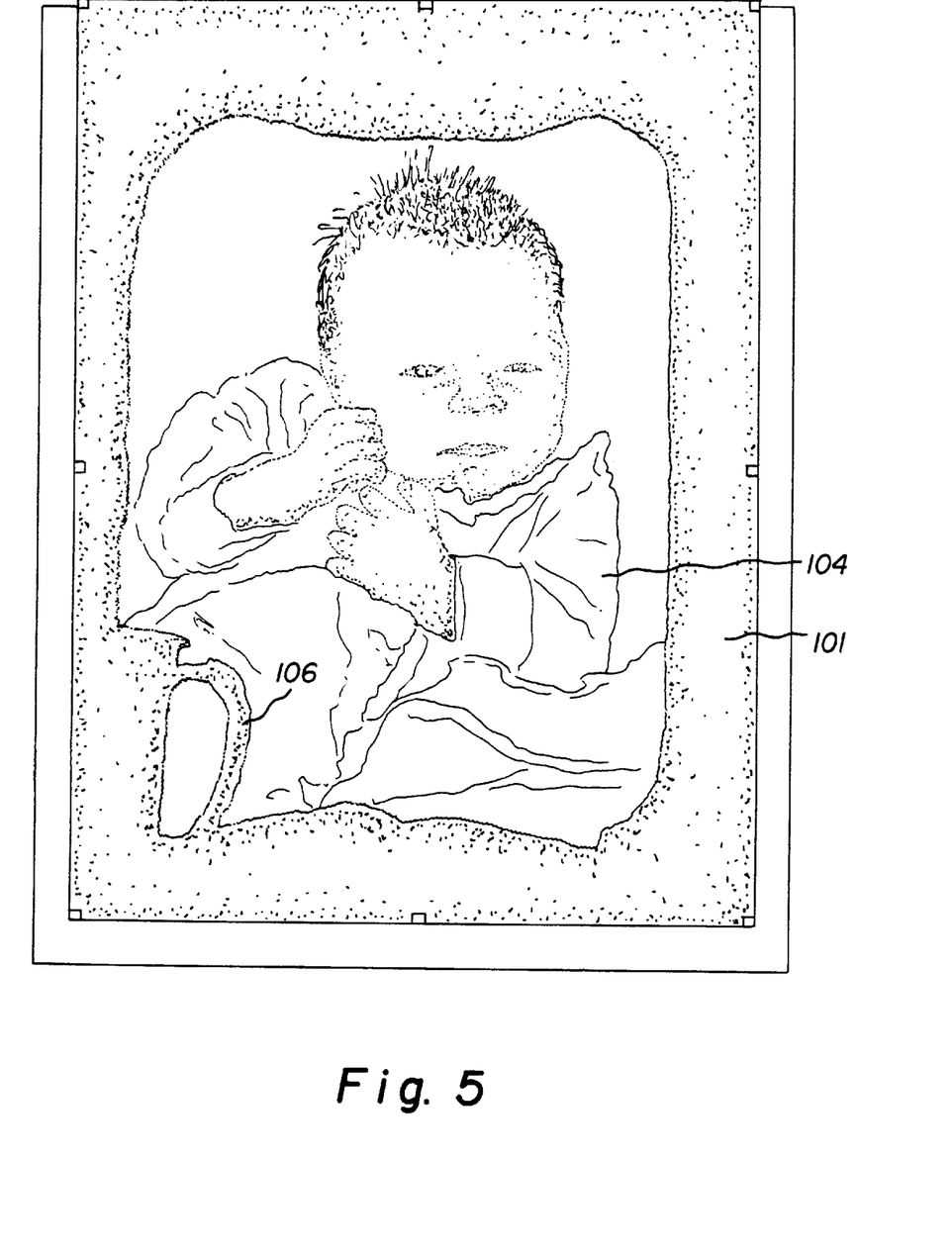
FIG. 5 is a view similar to FIG. 4 illustrating the customer generated image in a desirable position.

FIG. 5 illustrates movement of the customer generated image 104 to a more visually appealing position as this avoids any conflict between protrusions 106 in the prestored image 100 (see FIG. 2) with that of the customer generated image 104. However, the preview image is easily and quickly rendered, which allows the operator of the system to spend substantially less time in waiting for the merged image to be displayed so that the appropriate corrections can be made. By using a low resolution preview image and low resolution customer image, the rendering of the combined image on the CRT is less than approximately 10 seconds, a savings of over two minutes. This is a significant amount of time considering that the overall time an operator may spend is four or five minutes. Yet there is no sacrifice in quality of the final product as the high resolution image is used to make the final product in accordance with the instructions developed during the preview image.

Another feature of the present invention is that when working on the preview image and customer image 104, the surrounding portion 101 is displayed such that customer generated image is oriented in the normal viewed orientation. For example, referring to FIG. 2, location 102 is oriented at an angle α with respect to the horizontal plane H of the prestored image. However, when the surrounding portion 101 of location 102 is created with the customer generated digital image placed there and displayed on the CRT, the mask portion 101 is rotated such that the horizontal visual plane of the customer image is parallel with the horizontal visual plane of the operator as illustrated in FIG. 5. This allows the operator to more easily view any aesthetically unpleasant combinations more easily and work on the merged image.

Figure 6:
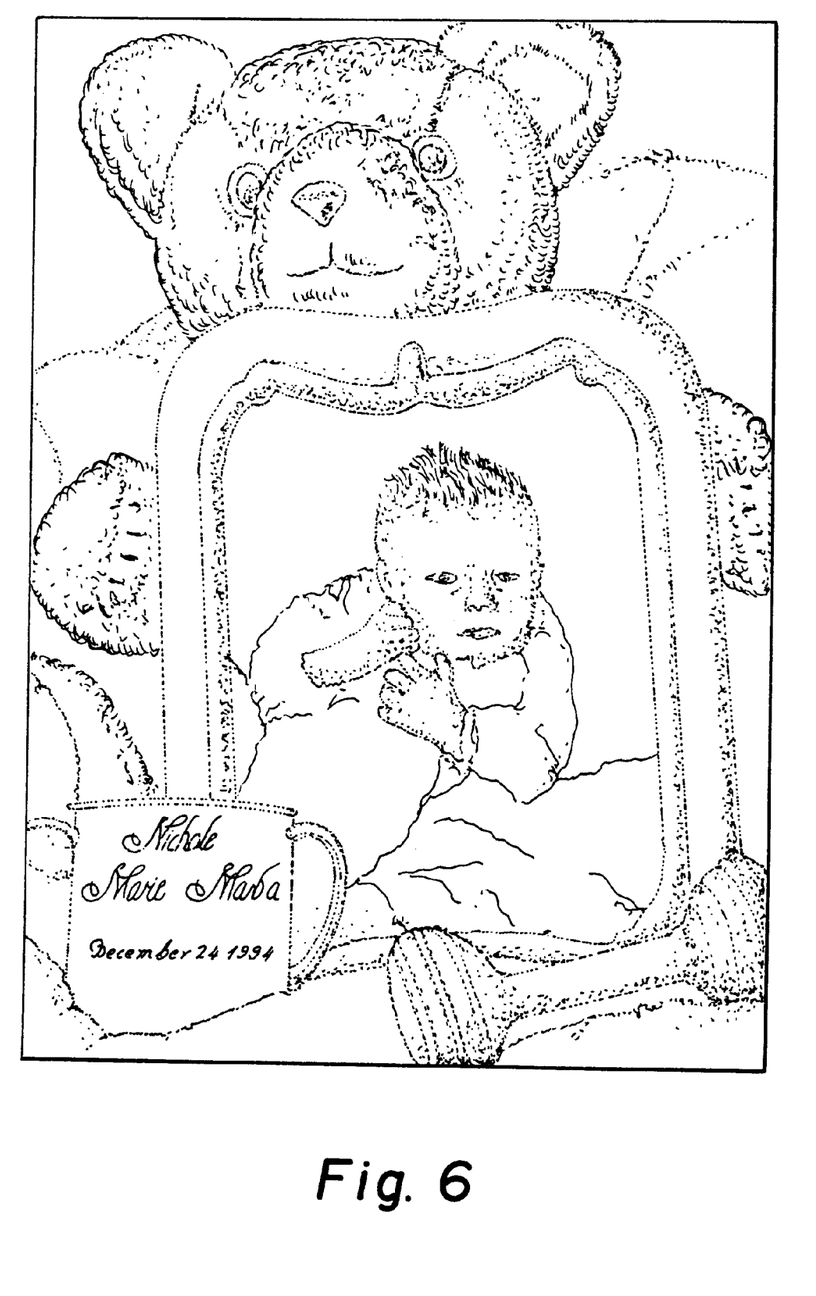
FIG. 6 illustrates the merging of the prestored image of FIG. 2 with the customer generated image of FIG. 3.

When the preview image is being displayed, any other desired modifications can be made, including making or adding of text to the device. After all the modifications have been made, the image manipulation instructions are developed and forwarded to the CPU 10 where the high resolution of image 100 and high resolution of customer generated image 104 are merged in accordance with the image merging instructions. While the merging of the two high resolutions can take up to several minutes, the operator at this time has proceeded onto another job minimizing any loss of efficiency to the operator. Once the high resolution images have been merged, the merged image is then sent to the appropriate output device where it is printed, stored, or transmitted. FIG. 6 illustrates a properly merged customer generated image with the prestored image.

Figure 7:
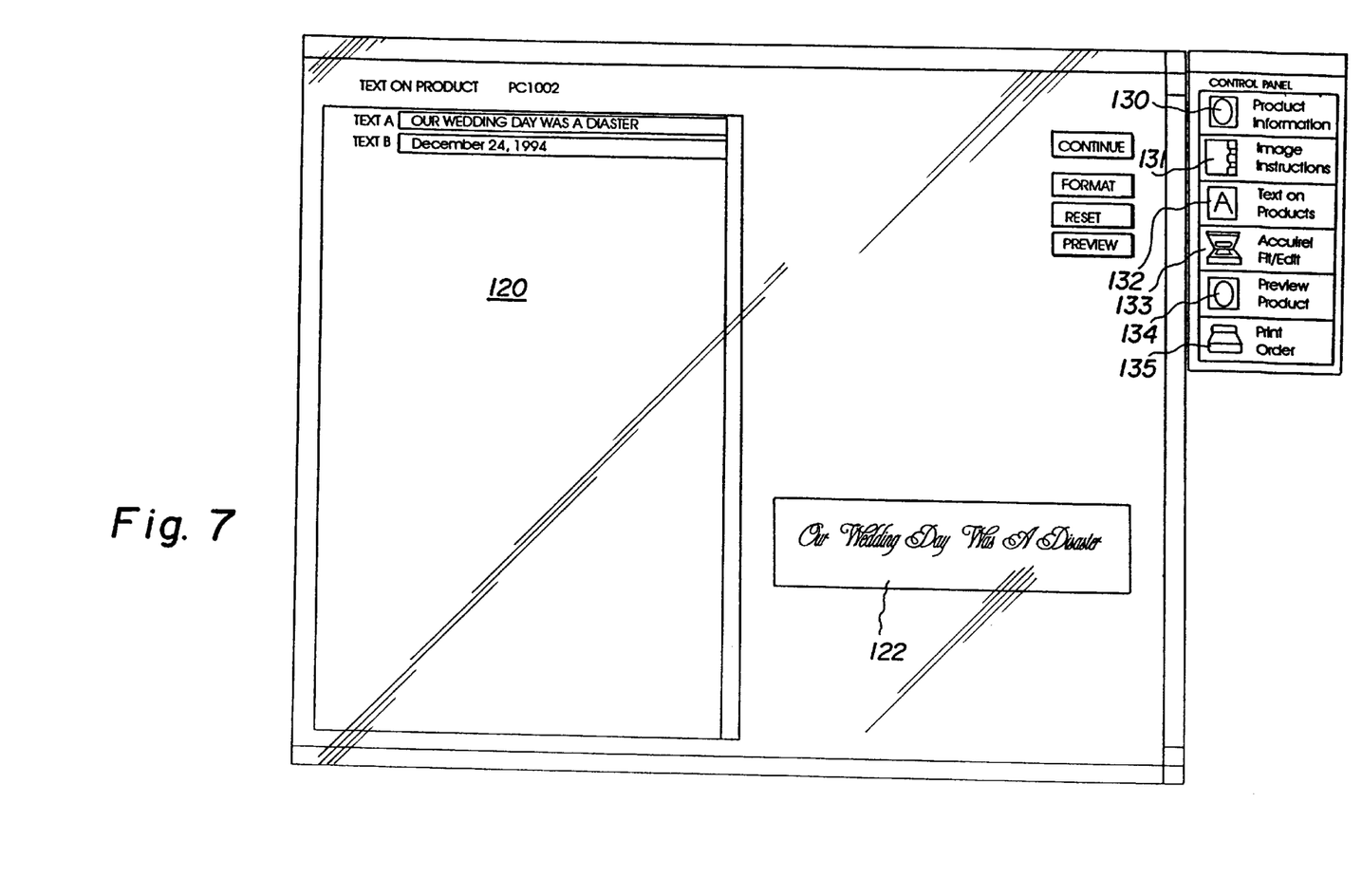
FIG. 7 is an illustration of a display screen used by the operator to enter text into the system which will be incorporated into the merged digital image.

Referring to FIG. 7, there is illustrated a text entering mode for entering of text that may be provided. This text editing mode has a working screen that includes a first text editing portion 120 wherein the actual text that is being typed in by the operator is displayed in a form that is easy to read and also which clearly describes where text is to be placed. The screen illustrated in FIG. 7, shows that there are two locations for the placement of text; text A and text B. As can be seen with regard to text A, which is highlighted because this is the text currently being worked on by the operator, the font used is of the typical word processing font which can be clearly and easily read by the user. However, quite often the text and font that are to be displayed on the fully rendered merged image can be quite different, and in some cases very difficult to read. The text editing screen illustrated in FIG. 7 further includes a representation box 122 which is representative of the size of the location in which the text is to be placed. The text in the box 122 is also illustrated in a font and size as it will be actually seen in the final product. As can be seen in the present instance in box 122, the font is of a style and size that it may be difficult for the operator to easily and clearly read, whereas the text in box 122 is of a typical size and font of a text editing mode which is much more easily and clearly read. This can help avoid any unnecessary errors in context or spelling. Another frequent problem that is easily resolved is the employment of an automatic spell check feature, which will automatically check spelling of words that are entered into the box 122. Should there be an incorrect spelling, an appropriate notation would be immediately displayed on the screen for the user to decide whether or not the word as originally typed is correct. This further assists in minimizing any spelling errors which are frequently made by the customer in making orders.

Another problem that has existed in the prior art system is that the size of the text that is entered is of such a nature that it is extremely difficult to read. In the preferred embodiment illustrated, the size of the text is automatically maximized in accordance with the number of characters entered. Thus, as more characters are entered, i.e., the longer the message, the size of the font will be adjusted so that the text will be maximized in accordance with the size of the location in which it is to be placed. However, if too much text is entered, the size of the font will be too small for easy reading. In the preferred embodiment illustrated, a warning notice (not shown) would be displayed advising the operator that the text selected is too small for appropriate reading.

The editing screen also has many other features that are typically found, for example, continue, format, reset, and preview buttons are provided for providing other normal operations to the merged image. The control panel also has various other selection areas for selecting other procedures such as, but not limited to, product information, image instructions, text on product, required fit editing, preview product, print order. Thus, the operator at one point can jump from job to job so as to further increase the productivity speed of the production system. Likewise, various other operations may be conducted as illustrated by icons 130, 131,132,133, 134,135, which represent various operations to be conducted on the order.

After all the manipulations to the image and/or text have been made to the preview image, appropriate instructions are developed and forwarded to the CPU for controlling the manner in which the high resolution prestored image and the high DPI resolution customer generated image and/or text are digitally merged at the desired DPI resolution, which is typically substantially higher than the preview image. Since the operator has completed all of the editing work with low resolution DPI images, loss in efficiency is minimized in that the operator is not waiting for a fully rendered image to be displayed on the CRT. The operator can be working on the next customer's order as the previous order is being fully rendered by the CPU and the appropriate output device.

In view of the foregoing, Applicants have provided a method and system whereby increased productivity is provided and improved quality, while at the same time improving the quality of the overall final product.

It is to be understood that various other changes and modifications may be made without departing from the scope of the present invention. The present invention being defined by the following claims.

Parts List

10 . . . central processing unit
11, 13 . . . data link system
12,14,16,18,20,22 . . . input devices
32,34,36,38,40,42 . . . output devices
44 . . . server
100 . . . prestored digital image
101 . . . portion
102 . . . location/opening
104 . . . customer generated image
105 . . . dash line
106 . . . protrusion
108 . . . mask representation
120 . . . editing portion
122 . . . representation box
130,131,132,133,134,135 . . . icons

What is claimed is:

1. A method of combining a first captured generated digital image and/or text and a second prestored digital image, said second prestored digital image having one or more predetermined locations where a captured digital image and/or text may be placed, comprising the steps of:

a) providing said one first captured generated digital image;

b) providing said second prestored digital image;

c) displaying a mask representation of at least a portion of said second prestored digital image on a visual display device with said captured generated digital image and/or text placed in said one or more predetermined locations so as to produce a preview image, said mask representation comprising a silhouette;

d) making any desired modification to said captured generated digital image and/or text based on said preview; and e) combining the first captured generated digital image and/or text as modified with said selected second prestored image so as to form a merged digitally composed image.

2. The method according to claim 1 where said modification comprises repositioning of said at least one first captured generated digital image and/or text at said predetermined location.

3. The method according to claim 1 wherein said mask is of a first DPI resolution.

4. The method according to claim 3 wherein said merged image is of a second DPI resolution, said first DPI resolution being substantially less than said second DPI resolution.

5. The method according to claim 4 wherein said first DPI resolution is equal to or less than about 60% of said second DPI resolution.

6. The method according to claim 4 wherein said first DPI resolution is about 70 DPI and said second DPI resolution is about 250 DPI.

7. The method according to claim 1 further comprising:
providing at least one output device means for printing, displaying, transmitting, or storing of an image and forwarding the merged image to said at least one output device.

8. A method of combining a first captured generated digital text and a second prestored digit image, said second prestored digital image having one or more predetermined locations where a captured generated digital image and/or text may be placed, comprising the steps of:

a) providing a first captured generated digital text;

b) providing a second prestored digital image; and c) automatically sizing said text in accordance with a predetermined relationship prior to merging said at least one first captured generated digital text and said second prestored image, said predetermined relationship comprising maximizing the font size of said text in accordance with the size of said location.

9. A method of combining a captured generated digital image and/or text and a second prestored digital image, said second prestored digital image having one or more predetermined locations where said captured generated digital image and/or text may be placed, comprising the steps of:

a) providing a first captured generated digital image at a first DPI resolution;

b) providing a prestored digital image stored in memory at a second DPI resolution and at a third DPI resolution, said third DPI resolution being substantially less than said second DPI resolution;

c) displaying said first captured digital image and/or text and a mask representation of said second prestored digital image of said third DPI resolution on a visual display device for previewing of the merged imaged, said mask representation comprising a silhouette;

d) modifying said first captured digital image and/or said second prestored digital image during said previewing so as to obtain image merging instructions for effectuating said modifications; and e) combining the said first captured generated image and second prestored digital image said second DPI resolution in accordance with said image merging instructions so as to form a newly merged digital image at said second DPI resolution.

10. The method according to claim 9 wherein said third DPI resolution is equal to or less than about 60% of said second DPI resolution.

11. The method according to claim 9 wherein said third DPI resolution is about 70 DPI and said second DPI resolution is about 250 DPI.

12. The method according to claim 9 wherein said image merging instructions includes removal of red eye; dust busting; date removal; and improving brightness contrast.

13. The method according to claim 9 further comprising:
providing at least one output device means for printing, displaying, transmitting, or storing of an image and forwarding the merged image to said at least one output device.

14. A method of combining a first captured generated digital image and/or text and a second prestored digital image, comprising the steps of:

a) obtaining a first captured generated digital image at a first DPI resolution and at a second DPI resolution, said first DPI resolution being substantially less than said second DPI resolution;

b) selecting a second prestored digital image, said second prestored digital images having one or more predetermined locations where a captured digital image and/or text may be placed and being stored-in memory at a third DPI resolution and at a fourth DPI resolution, said third DPI resolution being substantially less than said fourth DPI resolution;

c) displaying a mask representation of said selected second prestored digital image at said third DPI resolution on a visual display device with said first captured generated digital image and/or text placed in said predetermined location at said first DPI resolution so as to produce a preview image, said mask representation comprising a silhouette; and d) forming a final merged image using said at least one first captured generated digital image of said second DPI and said selected one of said prestored digital image of said fourth DPI.

15. The method according to claim 14 further comprising the step of modifying said first captured digital image and/or said second prestored digital image during said previewing so as to obtain image merging instruction.

16. The method according to claim 15 further comprising the step of combining the said first captured generated image and second prestored digital image of said second DPI resolution in accordance with said image merging instructions so as to form a newly merged digital image at said second DPI resolution.

17. The method according to claim 14 wherein said first DPI resolution is equal to or less than about 60% of said second DPI resolution and said third DPI is equal to or less than about 60% of said fourth DPI.

18. The method according to claim 14 wherein said first and third DPI resolution is about 70 DPI and said second and fourth DPI resolution is about 250 DPI.

19. A system for combining a captured generated digital image and/or text and a second prestored digital image, comprising:

a) means for providing a first captured generated digital image and/or text and a plurality of prestored digital image, both said first captured generated and said plurality of prestored images being stored in memory at a first DPI resolution and a second DPI resolution, said first DPI resolution being substantially less than said second DPI resolution;

b) means for selecting one of said prestored digital images, each of said second prestored digital images having one or more predetermined locations where said first captured generated digital image and/or text may be placed;

c) a visual display device for displaying a mask representation of said selected second prestored digital image of said first DPI resolution with said captured generated digital image and/or text placed in said one or more predetermined locations so as to produce a preview image, said mask representation comprising a silhouette;

d) means for making modifications to said first captured generated digital image and/or text while said preview image is being displayed so as to produce image merging instructions; and e) means for combining the first captured generated digital image and/or text at said second DPI resolution with said second prestored image at said second DPI in accordance with said image merging instructions so as to form a merged digitally composed image subsequent to viewing said preview image.

20. The system according to claim 19 where said modification comprises repositioning of said at least one first captured generated digital image and/or text at said predetermined location.

21. The system according to claim 19 wherein said first DPI resolution is equal to or less than about 60% of said second DPI resolution.

22. The system according to claim 19 wherein said second DPI resolution is 270 DPI, said first DPI resolution being 70.

23. The system according to claim 19 further comprising: at least one output device means for printing, displaying, transmitting, or storing of an image.

24. A system for combining a first captured generated digital image and/or text with a second prestored digital image, comprising:

a) means for selecting said second prestored digital image having one or more predetermined locations where said first captured generated digital image and/or text may be placed;

b) a visual display device for displaying a digitally formed image;

c) means for making a digitally formed preview image, said preview image comprising combining said captured generated digital image and/or text merged with a mask representation of said second prestored image at a first DPI resolution, said mask representation comprising a silhouette; and d) means for combining the first captured generated digital image and/or text with said second prestored image so as to form a second merged digitally composed image of a second DPI resolution, said second DPI resolution being substantially greater than said first resolution.

25. The system according to claim 24 further comprising a printer for printing said second merged digitally composed image.

26. The system according to claim 24 further comprising means for modifying said first captured digital image and/or said second prestored digital image during said previewing so as to obtain image merging instructions.

27. The system according to claim 26 further comprising means for combining the said first captured generated image and second prestored digital image of said second DPI resolution in accordance with said image merging instructions so as to form a newly merged digital image at said second DPI resolution.

* * * * *